United States Patent [19]

Tax et al.

[11] Patent Number: 6,124,932
[45] Date of Patent: Sep. 26, 2000

[54] METHOD FOR TARGET-PATH CORRECTION OF A LOAD CARRIER AND TARGET-DETECTION DEVICE AND DIRECTIONAL BEAM-EMITTING UNIT FOR PERFORMANCE OF SAID METHOD

[76] Inventors: Hans Tax, Potsdamerstrasse 1a, München D-80202; Dieter Bauer, Keplerstrasse 2, München D-81679; Klaus Hösler, Emmeringerstrasse 15, Eichenau D-82223, all of Germany

[21] Appl. No.: 09/169,126

[22] Filed: Oct. 9, 1998

Related U.S. Application Data

[63] Continuation of application No. PCT/EP97/01756, Apr. 9, 1997.

[30]     Foreign Application Priority Data

Apr. 10, 1996 [DE]   Germany .......................... 196 14 248

[51] Int. Cl.[7] .................................................. G01B 11/00
[52] U.S. Cl. .......................... 356/372; 356/385; 356/375; 212/285
[58] Field of Search .................................... 356/372, 375, 356/379, 380, 383, 385; 250/559.29, 559.3; 212/270, 271, 272, 273, 276, 285

[56]                References Cited

U.S. PATENT DOCUMENTS 5,048,703   9/1991   Tax et al. .................................. 212/153
5,152,408  10/1992   Tax et al. .................................. 212/270

FOREIGN PATENT DOCUMENTS 0 342 655 A2  11/1989   European Pat. Off. .
0 677 478 A2  10/1995   European Pat. Off. .
44 16 707 A1  11/1995   Germany .
195 19 741
          A1  12/1996   Germany .

*Primary Examiner*—Hoa Q. Pham
*Assistant Examiner*—Sang H. Nguyen
*Attorney, Agent, or Firm*—Baker Botts L.L.P.

[57]                   ABSTRACT

A target-detection device (64) is used for the target-path correction of a container (36) that is being moved by a crane or a traveling hoist to a destination. The device includes a directional beam-emitting unit having a plurality of laser-beam emitters (76). The orientation of the emitters (76) relative to one another is varied to increase and reduce the size of the detection region.

51 Claims, 7 Drawing Sheets

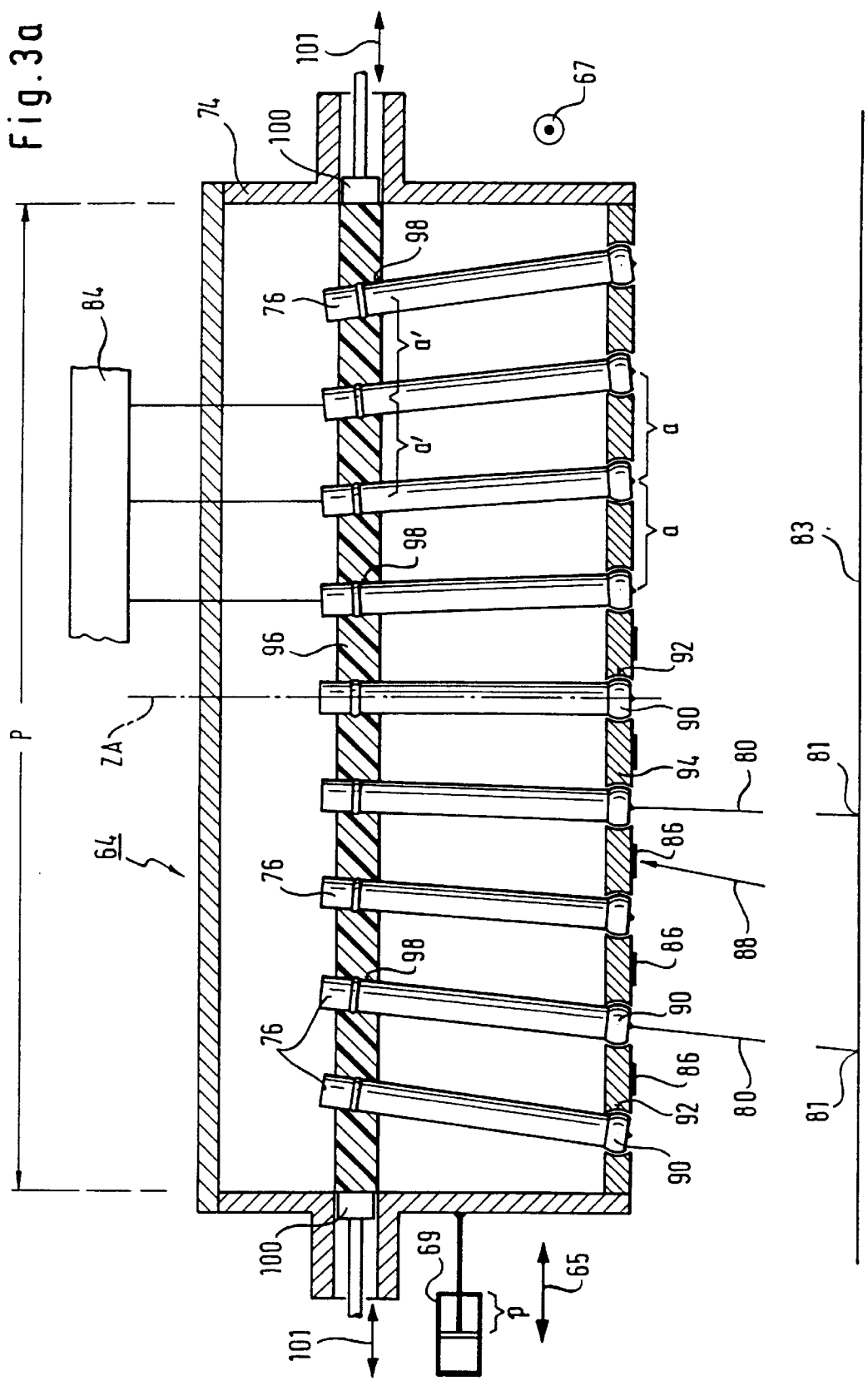

Fig.6a, Fig.6b, Fig.6c, Fig.7a, Fig.7b, Fig.7c

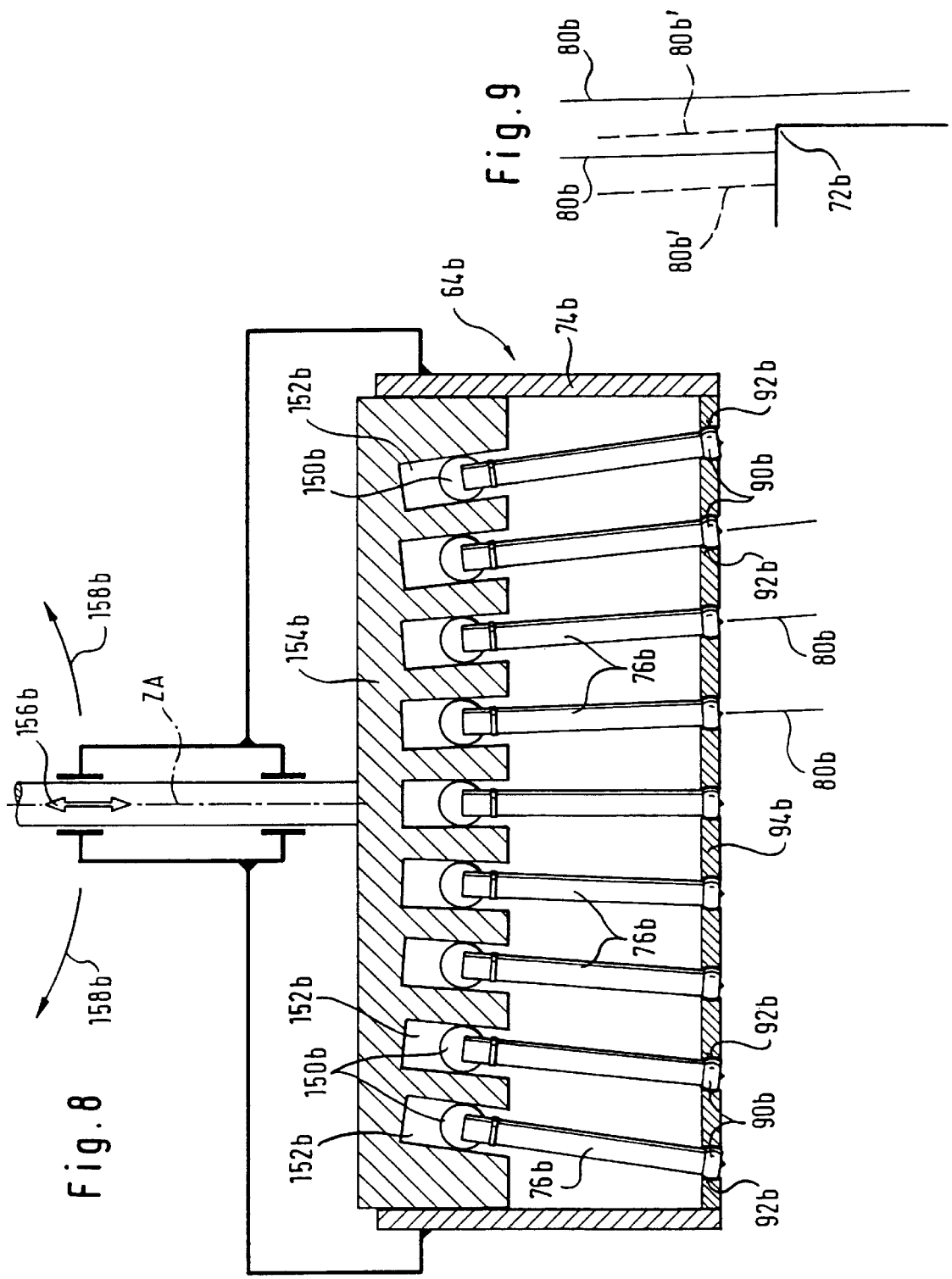

METHOD FOR TARGET-PATH CORRECTION OF A LOAD CARRIER AND TARGET-DETECTION DEVICE AND DIRECTIONAL BEAM-EMITTING UNIT FOR PERFORMANCE OF SAID METHOD

CONTINUATION APPLICATION

The present application is a continuation of International Patent Application No. PCT/EP97/01756, filed Apr. 9, 1997.

FIELD OF THE INVENTION

The present invention relates to a method for the target-path correction of a load carrier approaching a target position, which, for example, is suspended for height displacement on a horizontally movable hoisting cable carrier by a hoisting cable system, where a correction of the target-approach path of the load carrier is made during approach of the load carrier to the target on the basis of target-error detection. The target error detection method, in particular, includes the following steps:

a) pulsed directional beams from a directional beam-emitting unit arranged at the location of the load carrier are emitted in the direction of a detection region, so that pulsed directional beams, spaced apart in time, strike unlike partial regions of the detection region, b) scattered reflection corresponding to individual pulsed directional beams is received in a reflection-receiving unit having a known geometric relation to the directional beam-emitting unit, c) the travel time from emission of a pulsed directional beam to receipt of the corresponding scattered reflection is determined for a plurality of directional beams emitted to unlike partial regions, and d) on the basis of the travel times so determined and the known geometric relation of the associated directional beams to one another, data corresponding to a three-dimensional representation of at least part of the detection region are obtained.

BACKGROUND OF THE INVENTION

A method of the type described above is disclosed in DE 4 416 707 A1 (hereinafter "DE'707"), which was published on Nov. 16, 1995, and, accordingly, is not to be deemed prior art with respect to the present application. Pending U.S. patent application Ser. No. 08/747,942, filed Nov. 12, 1996, is a counterpart of DE'707.

The directional beam-emitting unit of FIG. 13 of DE'707 is composed of a plurality of laser beam transmitters distributed over a flat field. The transmitters are arranged in fixed positions on a common support. The size of the field over which the transmitters are distributed is such as to enable examination, in a short time, of singularities in their relations to a specific target field. In the method of DE'707, the direction of the directional beams issuing from the individual laser beam transmitters is unalterably defined by the relation of the transmitters to the common support.

SUMMARY OF THE INVENTION

An object of the present invention is to be able, by a method of the type described generally above, to vary the size of the detection region and the distribution of the partial regions within the detection region determined by the plurality of directional beams.

To accomplish the foregoing object, it is proposed, according to the invention, that the distances apart of the partial regions within the detection region be varied by variation of the geometric relation of the directional beams to one another.

Let an exemplary comparison between the method of FIG. 13 of DE'707, on the one hand, and the method according to the invention, on the other, serve to explain the above-mentioned object.

According to FIG. 13 of DE'707, the laser beams issuing from the directional beam-emitting unit are without exception arranged parallel to one another. This means that the respective detection region, for example on the deck of a ship, corresponds to the size of the field over which, according to FIG. 13 of DE'707, the laser-beam transmitters are distributed, at least if it is assumed that the beams strike the deck of the ship essentially orthogonally. The region that can be examined during a specified relative position between the directional beam-emitting unit and the ship is correspondingly small. Therefore, finding distinguishing structures that characterize the target during movement of the load along the surface of a ship causes difficulties. The size of the field over which the laser-beam emitters are distributed cannot arbitrarily be enlarged, for one thing, because of the usually limited space available in the region of the load carrier and, for another, because of the costs involved in multiplication of the transmitters.

Now, on the other hand, if according to the invention the possibility exists of varying the geometric relation of the directional beams to one another, this means, applied to FIG. 13 of DE'707, that a diverging bundle of directional beams can be made out of the bundle of parallel directional beams. Depending upon the degree of divergence of the beams, with an unaltered distance between the directional beam-emitting unit and the surface to be considered, the ship's deck for instance, the total region covered on the ship's deck can be enlarged. In this way, for example, the whole search region covered can be enlarged during the search for a specific characterizing structure for the target. Then, of course, the partial regions impacted by the individual beams of the diverging directional-beam bundle are spaced at a greater distance apart from one another than when a directional-beam bundle directed parallel is used. Nevertheless, with the diverging bundle it is as a rule possible to establish gross structures within the detection region impacted, for example, the presence of a corner of a container compartment entrance or the presence of container corner fittings.

For exact adjustment of the load carrier to the target location, which makes it possible to set the load carrier down on the target location at a high lowering speed, knowledge of the fine structure of the respective target location-determining surface design is often required. This fine structure cannot be discerned by a strongly diverging bundle of directional beams. Imagine that the fine structure to be recognized is formed of differences in level. The closer the difference in level between two directional beams is bracketed, the more exactly the position of these differences in level can be determined and converted into data for a three-dimensional representation.

In the method according to the invention, the possibility exists, for example, of arranging the directional beams in a diverging bundle to search for a characterizing structure for a target location and, after recognition of such characterizing structure within the detection field impacted by the diverging bundle, of concentrating the diverging bundle, optionally until parallelism of the beams and in addition until convergence of the beams.

Let it be noted once again that this possibility of enlargement and reduction of the detection field is independent of the distance of the directional beam-emitting unit from the surface to be examined.

If, in the definition of the method according to the invention, it was noted that the travel time for directional beams emitted to unlike partial regions is measured, this statement should in particular also include determination of the difference in travel time of adjacent directional beams, which is necessary for the determination of differences in level on the surface to be detected. Such travel time-difference measurements allow differences in level to be determined absolutely and also with regard to difference in level.

If, in addition, it is noted that the reflection-receiving unit is in a known geometric relation to the directional beam-emitting unit, this should in particular also include the case that the reflection-receiving unit is in rigid geometric relation to the directional beam-emitting unit.

If, in addition, the definition of the method according to the invention states that the geometric relation of the individual directional beams to one another must be known for determining the data for a three-dimensional representation, it should be noted that knowledge of the relative geometric relation of the individual directional beams already permits a data set corresponding to a three-dimensional representation to be obtained. Additionally, it is helpful for practical performance of the method according to the invention if the geometric relation of the individual directional beams to a coordinate system assigned to the directional beam-emitting unit is known.

By means of travel-time measurements and the known geometric relation of the directional beams to one another or, alternatively, the directional beams to a coordinate system fixed firmly on the directional beam-emitting unit, not only differences in height of individual surface regions of the surface to be examined from time to time, but also the horizontal coordinates of singularities, such as differences in level, can be determined, so that target-path corrections can be made by the horizontal coordinates. Possibilities for target-path correction are described in detail in DE'707. Reference is made to DE'707 for supplementing the present disclosure, in particular with regard to the possibilities of target-path correction.

If the definition of the method according to the invention in addition includes the statement that data corresponding to a three-dimensional representation of at least part of the detection region are obtained, it is in principle possible to use these data to develop an image visible to the eye on, for example, a screen. The operator is then in a position, based on observation of this visible image, in particular with simultaneous representation of the load carrier on the visible image, to take target-correction measures on the load carrier or on the hoisting cable carrier and to follow the effect of the corrective measures introduced by him on the visible image. However, this is but one possibility. It is alternatively possible to use the data corresponding to the respective three-dimensional representation directly for target-path correction, by comparing the actual location of the load carrier with the desired location, i.e., the target region, and deriving signals from the difference in location for horizontal correction of the load carrier. For further details concerning this, reference is made to the aforementioned DE'707 and to EP 0 342 655 A2. (See also the US counterparts of EP 0 342 655 A2, U.S. Pat. Nos. 5,048,703 and 5,152,408.) Owing to the fact that the directional beam-emitting unit is arranged on the load carrier, the relative position between a recognized target location and the respective actual location of the load carrier can easily be determined for the pictorial representation as well as for direct target-path correction.

It goes without saying that a multiplicity of additional parameters must be taken into account for target-path correction, e.g., the respective relative speed between load carrier and target location, the relative height of the load carrier over the target location and forces, for example, wind forces, acting on the load carrier.

When using the method according to the invention, it is in principle alternatively possible to vary the distances apart of parallel directional beams within a directional beam-bundle. However, because of the enlargement conditions thereby obtainable, the angles between directional beams to be emitted to unlike partial regions preferably are varied.

The beams to be emitted to unlike partial regions may be aligned by direction-determining components individually assigned to them; this means that the directional effects of at least some of these direction-determining components must be varied. For better understanding, one may imagine as direction-determining components, by way of example, completely assembled rod-shaped laser beam transmitters which emit the respective directional beam in the longitudinal direction of the rod; then variation of the directional effect is obtained simply by varying the relative angle between adjacent transmitters.

In principle, however, it is alternatively possible for a direction-determining component common to these directional beams and having a variable directional effect to be used for the alignment of directional beams to unlike partial regions of the detection region, and to vary the course of variation of the directional effect for varying the angle between these directional beams.

For better understanding of this last-mentioned embodiment of the method according to the invention, reference may be made to EP 0 342 655 A2, specifically, to FIG. 3 thereof. There, a spreader is found as the carrier of a container which is to be lowered into a compartment in the hull of a ship. A directional beam-emitting unit in combination with a reflection-receiving unit is arranged on the spreader. The various directional beams represented in a diverging bundle are produced with the use of a single emission source, in that a directional beam issuing from this single emission source is directed at a periodically moving reflecting mirror, so that directional beams are successively sent to the detection surface in a variety of directions.

As long as no special measures are taken, the reflecting mirror is exposed to a periodic swiveling motion about at least one axis, the amplitude and the frequency of this periodic motion being constant. Constancy of the amplitude at likewise constant frequency signifies an invariable geometric relation of the individual directional beams successively transmitted by the mirror. This means, in addition, that the detection field, at least with unchanged relative positions of load carrier and ship's hull, cannot be varied.

The concept of variation of the course of variation of the directional effect in the sense of the refinement of the invention last discussed may be implemented in such a way that, at constant swiveling frequency of the mirror, its swiveling amplitude is varied. Then, the successive directional beams, directed to unlike detection regions, become more divergent the greater the swiveling amplitude of the mirror is and vice versa.

It has already been pointed out that, after first-time detection of a characterizing target-structure region within a greater detection region, the detection region may be reduced with reduction of the distances apart of the partial regions. Now, if it is imagined that with the relative position of the load carrier and target location remaining the same, the greater detection region falls on the surface to be examined precisely so that the target-characterizing target structure of interest lies at the edge of the detection region, the next reduction of the detection region would lead to the target-characterizing target-structure region of interest no longer being in congruence with the reduced detection region; in other words, fine structural examination of the target-structure region would not be possible at all. For this reason, it often becomes necessary, before reduction of the detection region, to shift the center of the detection region in the direction of the target-characterizing target-structure region; this can be done, for instance, by adjusting an imaginary central axis of the directional-beam bundle, which preferably lies fixed with respect to the reflection-receiving unit, in the direction of the target-characterizing target-structure region. This "readjustment" is easily possible if one knows the position of the central axis with respect to a load bearer-fixed coordinate system, on the one hand, and, on the other, the relative position of the target-characterizing target-structure region of interest with respect to the load carrier-fixed coordinate system. Then, readjustment of the central axis can be carried out on the basis of the quantity of data available anyway, which is obtained with the use of measured travel times and in the knowledge of the geometric relation of the central axis of the directional-beam bundle to the load bearer-fixed coordinate system.

Using the method according to the invention, the detection region may be reduced as a function of approach of the load carrier to the detection region with reduction of the distances apart of the partial regions within the detection region. This takes into account the fact that with increasing approach of the load carrier to the surface containing the target location, fine structures must be examined to an increasing extent, in order finally to hit the target location accurately. In this connection, it helps that, owing to the target-correction measures already performed, the target-structure region to be examined very probably falls into the reduced detection region anyway. However, the readjustment principle mentioned above is applicable here, too.

At this point, it also becomes clear that variation of the detection region according to the invention is not comparable with variation of the detection region necessarily occurring with diverging directional-beam bundles as a function of the distance between the directional beam-emitting unit and the surface to be examined.

The direction-determining components mentioned above may be composed, for example, of directional-beam transmitters angularly displaceable relative to one another, i.e., for example a group of laser transmitters.

If a common direction-determining component, for example, a reflecting element or other directional beam-deflecting element, is used, and its periodic motion is varied in amplitude in order to vary the divergence of a directional-beam bundle issuing from said directional beam-deflecting element, a distinction is to be made between the case that periodic motion proceeds continuously and that continuous motion proceeds stepwise. In the case of stepwise performance of periodic motion, it is to be noted that when the amplitude of periodic motion is varied, the step length of periodic motion is also varied to a corresponding extent.

Up until now, only directional beams which correspond to individual partial regions of the respective detection region have been mentioned. It should be considered that, to obtain as accurate as possible representations of the conditions on the surface to be examined in each instance, series of pulsed directional beams may alternatively be emitted, the time sequence of these directional beams within such a series being set short enough for approximately the same partial region of the detection region to be impacted by the directional beams of this series in each instance; in other words, like results of measurement regarding travel time are also to be expected. In this way, a series of travel-time measurements is carried out and then the average of these travel-time measurements is taken as "travel time" for a specific partial region of the detection region.

To improve resolving power in the method according to the invention, during a condition of essentially unchanged geometric relation of the directional beams relative to one another a common transverse displacement substantially transverse to the direction of travel, preferably a periodic transverse displacement, may be superimposed on a group of directional beams, and in defined time phases of this transverse displacement at least part of the detection region is examined in each instance on the basis of travel times measured in the respective time phase and known geometric relation of the directional beams displaced by transverse displacement in the respective time phase, the data for producing the three-dimensional representation being obtained on the basis of measurements made in a series of time phases. In this connection, it should be noted that a plurality of travel-time measurements may alternatively be carried out in each of these time phases, so that an increased accuracy of measurement is obtained by averaging.

In addition, it should be pointed out that the relation of directional beams to one another or to a common coordinate system as a function of at least one position-determining parameter is determined by a preceding calibration process in which the relation of the directional beam is determined for a plurality of values of this at least one parameter in each instance, and that in determining the data for obtaining the three-dimensional representation, the data concerning the relation of the directional beams are determined as a function of the respective value of the at least one parameter. It is possible, in this connection, for the data concerning the geometric relation of individual directional beams to be obtained as a function of the respective value of the at least one parameter by measurement of the respective directional beam. These calibration possibilities have the great advantage that deviations from a specific program of motion of the directional beams are eliminated.

In addition, the invention relates to a target-detection means for detecting the target location of a moving load carrier, comprising a directional beam-emitting unit, connected with the moving load carrier for common motion, which is designed to emit pulsed directional beams, spaced apart in time, in the direction of unlike partial regions of a detection region, additionally comprising a reflection-receiving unit with known geometric relation to the directional beam-emitting unit, said reflection-receiving unit being designed to receive the scattered reflection corresponding to individual pulsed directional beams, additionally comprising travel time-measuring means, in order to determine the travel time of pulsed directional beams from the moment of emission to the moment of receipt, additionally comprising calculating means which are designed to obtain data corresponding to a three-dimensional representation of at least part of the detection region on the basis of the measured travel times and the known geometric relation of the associated directional beams to one another. In this connection, according to the invention directional means, which permit varying the relative geometric relation of the directional beams to be emitted to various partial regions of the detection region, are assigned to the directional beam-emitting unit.

Then, the directional means may be designed to vary the angle between directional beams emitted to unlike partial regions.

In a first alternative, it is provided that the directional means for directional beams to be emitted to unlike partial regions comprise these individually assigned and variable direction-determining components for the relative fixing of direction of the directional beams.

According to another alternative, it is provided that the directional means for directional beams to be emitted to unlike partial regions comprise a common direction-determining component having variable directional effect, the directional effect of this direction-determining component being variable in terms of variation of the angle between the directional beams.

In addition, the directional beam-emitting unit may be variable in its geometric relation to a load bearer-fixed coordinate system; then, a common motion of these directional beams relative to the load bearer-fixed coordinate system may still be superimposed on the relative motion of the directional beams to be directed to various partial regions, in order, for instance, to be able to carry out the "readjustment" mentioned above. In particular, it is possible for the directional beam-emitting unit to have a central axis, defined by the directional beams to be emitted to various partial regions of the detection region, whose angular position is variable with regard to the load carrier-fixed coordinate system.

Then, the calculating means are designed so that, on the basis of measured travel times, known geometric relation of the directional beams to one another and known angular adjustment of the central axis with respect to the load carrier-fixed coordinate system, the data corresponding to a three-dimensional representation of at least part of the detection region can be obtained.

According to a preferred embodiment, it is provided, that the direction-determining components are carried for swiveling motion, preferably by being gimbal-mounted, on a common support, and are connected with swiveling angle-adjusting means that permit the individual direction-determining components to swivel in mutual dependence. In order to obtain as simple as possible a mechanical design of the swiveling angle-adjusting means, an embodiment may be constructed so that the swiveling angle-adjusting means comprise an elastic connecting system, coupling together the direction-determining components outside the swivel bearing points, which is elastically deformable in at least one direction by the application of external forces. The elastic connecting system may be composed, for example, of an elastomer member; the latter may be designed as an elastomer plate which is deformable in at least one direction, preferably in two directions orthogonal to one another.

Here, too, the direction-determining components may again be composed of individual directional transmitters, in each instance comprising an emission source, for example, of laser-beam transmitters. If the direction-determining components are rod-shaped, it may be provided that swivel seating is effected at one of two points of the rod-shaped element spaced apart in the longitudinal direction of the rod, and that swiveling angle-adjusting means engage at the second of these axially spaced-apart points in each instance.

If a common direction-determining component having variable directional effect is used, it is possible for the common direction-determining component having variable directional effect to be composed of a directional beam-reversing element connected downstream of a common emission source in the path of the rays, which element is connected with a periodic swivel drive, the periodic course of motion imparted to the common directional beam-reversing element being variable. Then, for the reasons already indicated above in connection with statements concerning the method, the swiveling amplitude of the directional beam-reversing element, at constant frequency, may be variable. If the periodic swiveling motion takes place stepwise, it should be noted that the step size is variable according to the magnitude of swiveling amplitude.

As already mentioned in connection with the description of the method, the directional beam-emitting unit may be mounted on a load carrier which is suspended for displacement in height on a horizontally movable hoisting cable carrier by a hoisting cable system. At the same time, it is advantageous that the directional beam-emitting unit be mounted on a movable supporting element which is displaceable relative to the load carrier between an active position and a retracted position, the active position being designed so that directional-beam impinging of the detection region is possible even when the load carrier is joined with a load and the retracted position being designed so that the load carrier, optionally coupled with a load, is able to enter cramped spaces in ships, such as on container stacks or in container compartments.

The target-detection means according to the invention need not be mounted on a load carrier suspended by a cable system. The target-detection means could alternatively be used, for example, to detect a target location for a crane trolley.

The target-detection means may in addition be designed so that the directional beam-emitting unit is assigned a transverse displacement means which is suitable, in at least one condition of the geometric relation of a group of directional beams to one another, for imparting a common, preferably periodic, transverse displacement to the directional beams of this group, and so that the calculating means are designed to calculate the data corresponding to a three-dimensional representation of at least part of the detection region on the basis of travel-time measurements for a variety of transverse displacement conditions of a series of transverse displacement conditions which are brought about by the common transverse displacement. This design of the target-detection means permits an improvement in resolving power. For a distance apart of the partial regions specified by the mutual relation of the directional beams, the position of a specific edge at which a change in travel time occurs can be determined more accurately if it corresponds to the distance apart of the partial regions transverse to this edge.

The invention additionally relates to a directional beam-emitting unit which is usable in particular for performance of the method according to the invention and as part of the target-detection means according to the invention, but alternatively has additional possible applications besides.

This directional beam-emitting unit is designed so that the individual direction-determining components are arranged, movable relative to one another, on a common support and are displaceable relative to one another by a drive system which is common to them.

There the individual direction-determining components may be mounted for swiveling, preferably in a swiveling gimbal-mounted arrangement, on the common support and, outside their swivel support, be acted upon by the common drive system. Then, the common drive system may be composed of an elastic connecting system connecting the direction-determining components together, which system is deformable by the action of external force so that, as a consequence of this deformation, coordinated swiveling motions are imparted to the individual direction-determining components. This results in minimal mechanical effort to obtain coordinated swiveling motions of the direction-determining components.

The elastic connecting system may, for example, comprise an elastomer belt or an elastomer film or an elastomer plate which is displaceable in at least one direction, and optionally in two directions orthogonal to one another.

For example, with a rod-shaped form of the direction-determining components, it is possible for the rod-shaped components to penetrate the belt or the film or the plate and thereby be connected articulated with the latter. This allows the swivel bearing points of adjacent direction-determining components to be approximately like equidistant from one another within the series or the field, and the connecting points of adjacent direction-determining components with the elastic connecting system likewise to have an approximately equal spacing from one another, and the distance apart of these connecting points from one another being essentially constantly increased or reduced when force acts upon the elastic connecting system.

According to another embodiment, the common drive system has control surfaces for the individual direction-determining components which, in spaced relation from the swivel bearing mounts, are in engagement with the direction-determining components. There, the control surfaces may be mounted on a control-surface support common to at least one group of direction-determining components. In particular, it is possible for the control surface support to be movable essentially orthogonal to a swivel bearing surface containing the swivel bearing and to have a control bore for each of the individual direction-determining components.

Regardless of how the common drive system is designed, it is possible for at least one group of direction-determining components to be essentially jointly displaceable by an additional displacement means. In this connection, the additional displacement means may act either upon the common support of the direction-determining components or, alternatively, upon their common drive system.

If the directional beam-emitting unit is used in connection with the method for target-course correction described above or in connection with the subsequently described target detection means, the following should be noted: Even if coupling of the individual direction-determining components through a common drive system does not lead to highly precise coordination of motion, detection failures remain negligible. Namely, the following must be taken into account: In a calibration process, it is easy to determine which swivel positions of the individual direction-determining components correspond to a specific condition of the common drive system. Now, a data collection which retains the data describing the respective swivel position of individual direction-determining components for all conditions of the common drive system that are encountered, may be applied in connection with this calibration process. Therefore, on the basis of travel-time measurements and data concerning the geometric relation of the directional beams associated with one another or the geometric arrangement of these directional beams in a specific coordinate system, the data corresponding to the geometric relation in each instance may be found in the data collection by calling up from the latter the data corresponding to a specific condition of the common drive system. One could consider using the directional beam-emitting unit for, for example, more or less focusing directional beams at a varying distance apart in the directional beam-emitting unit and an object to be illuminated or heated.

DESCRIPTION OF THE DRAWINGS

The accompanying figures illustrate exemplary embodiments of the invention:

FIGS. 3a and 3b, show a directional beam-emitting unit according to the invention, in various operating conditions;

FIGS. 6a, 6b, 6c and 7a, 7b, 7c, a variant embodiment of the invention;

FIG. 8, an additional variant embodiment of the invention; and

FIG. 9, a schematic representation for assisting the explanation of scanning.

DESCRIPTION OF THE EMBODIMENTS

Figure 1:
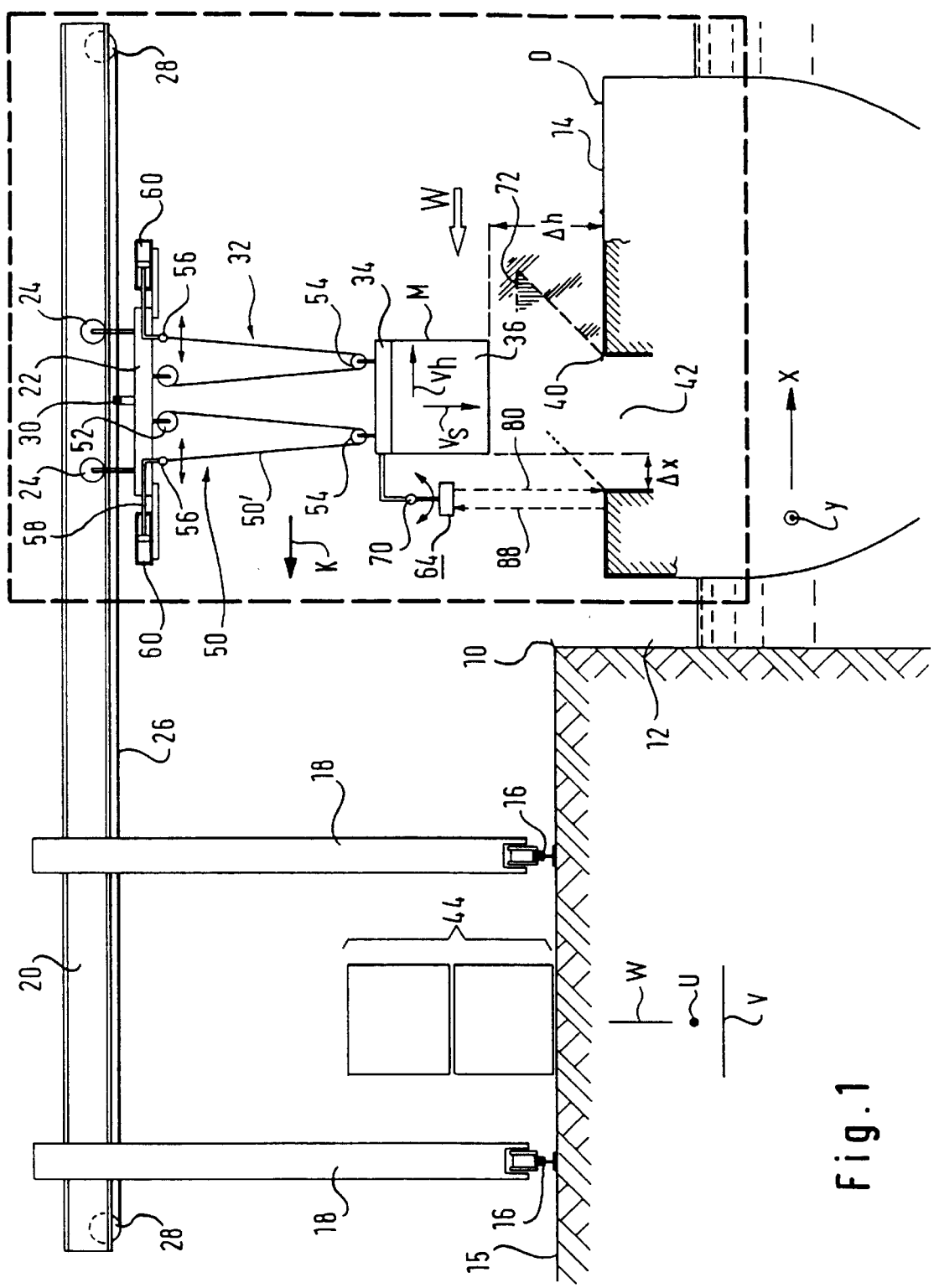
FIG. 1 shows a crane system with target-detection means according to the invention.

FIG. 1 shows a port installation with a dock edge; the latter is labeled 10 and runs perpendicular to the plane of the drawing. Lateral to the dock edge 10 is found a harbor basin 12, in which a ship 14 lies. The ship 14 is assumed to be tied up at the dock edge and is to be loaded with containers. A roadway 15 of the harbor ground is found on the left side of the dock edge. On this roadway 15 are placed rails 16, on which a crane frame or crane tower 18 rides. The crane frame or tower 18 supports a bridge girder 20. This girder 20 extends, orthogonal to the dock edge, over the ship 14. A crane trolley 22 is capable of travel on the bridge girder 20, by track wheels 24, in the longitudinal direction of the girder 20. Transport drive of the trolley 22 along the entire bridge girder 20 is effected by a hauling cable 26, which extends between two reversing rollers 28 and is provided with a drive. The cable 26 is connected for driving with the hoisting cable carrier 22 at 30, so that the cable carrier 22 is capable of being driven over the entire length of the bridge girder 20 by longitudinal motion of the lower strand of the cable 26. A load carrier in the form of a so-called spreader, which is labeled 34, is suspended on the cable carrier by a hoisting cable system 32. A container 36, which is to be conveyed to a place within the ship 14, is suspended on the spreader 34. On the ship 14 there is found the entrance 40 of a container-accommodating compartment, in which a multiplicity of containers 36 can be stacked on one another. The entrance 40 at the top of the container-accommodating compartment 42 forms a target position for the container 36. The container 36 has been picked up by the spreader 34 from a container pile 44 in the region of the crane system and shifted from left to right into the position shown in FIG. 1 by movement of the trolley 22. During this shifting motion, appropriate control of the motion of the hoisting cable 26 has already brought the load carrier 34 approximately into alignment with the entrance 40 of the container compartment. In addition, appropriate accelerations and decelerations of the hoisting cable 26 have already kept swinging motions of the load carrier 34 taking place parallel to the plane of the drawing as small as possible or, if such swinging motions have already appeared, they are substantially suppressed. Accordingly, it must be assumed that the load carrier 34 with the container 36 in the situation represented in FIG. 1 is already approximately in alignment with the target position, i.e., with the entrance 40 of the container-accommodating compartment 42 and is essentially swing-free. Nevertheless, the load carrier 34 with the container 36, as represented in exaggerated form in FIG. 1, is not yet in exact alignment with the entrance 40 of the container compartment, making additional corrective motions of the load carrier 34 necessary in the horizontal direction parallel to the plane of the drawing and possibly also perpendicular to the plane of the drawing, so that the load carrier 34 with the container 36 can be lowered without interruption at the entrance 40 of the container compartment 42 into the compartment in the course of its lowering motion.

Of two hoisting cable lines 50 of the hoisting cable system 32 of FIG. 1, the line 50, represented on the left in FIG. 1, will be described in detail. Said cable line 50 runs from a cable drum 52, which is rotatable and fixed in place on the trolley 22, over a cable reversing roller 54 on the spreader 34 to a cable anchoring point 56, which is in turn mounted on the trolley 22. It can readily be seen that a total of four such hoisting cable lines 50 may be mounted on the spreader 34, each of which cooperates with a reversing roller 54. The rollers 54 may be arranged in the four corners of a rectangularly designed spreader 34. It can be seen that the anchoring point 56 of the cable line lies on a slide 58, which is carried for displacement in the horizontal direction parallel to the plane of the drawing on the trolley 22, i.e., on the frame of the trolley. A hydraulic power device 60 is provided for shifting of the cable anchoring point 56 with the slide 58, so that the course of the cable element 50' of the line 50 may be varied. It is immediately apparent to a person with expertise in mechanics that displacement leftward of the cable element 50' from the position sketched results in a change of equilibrium, and that owing to this change of equilibrium, a force K is exerted on the load carrier 34 in the horizontal direction parallel to the plane of the drawing, represented by the arrow K. In addition, it is apparent that the magnitude of the force K depends upon the slope of the cable element 50' at the beginning and at the end of its displacement, in addition to being dependent upon the course of motion of the cable anchoring point 56, which is imparted to it by the hydraulic power device 60.

To sum up, it may be stated that the magnitude of the force K can be determined by displacement of the cable anchoring point 56 with respect to the hoisting cable carrier, i.e., with respect to the trolley 22. In addition, it can be seen that only a relatively small mass must be set into motion for displacement of the cable anchoring point 56 and that, in any case, the principal mass of the trolley 22 need not be moved in order to displace the cable anchoring point 56 for producing the force K.

In FIG. 1, it can be seen that the force K, the genesis of which has been described, can be used as a corrective force in order to bring the load carrier 34 and the container 36 borne by it into alignment with respect to the target position 40, which is determined by the entrance of the container-accommodating compartment 42. Now, it must be taken into consideration that the load carrier 34, at the moment represented by FIG. 1, has a lowering speed $v_s$ and possibly also a horizontal speed $v_h$, possibly also an acceleration in the direction of the arrow $v_h$, representing the horizontal speed.

In addition, it must be considered that the load carrier 34 and the container 36 possibly are subject to a wind force W.

It can be seen further that the lower end of the container 36 still has a distance Δh in the vertical direction with respect to the target position 40 and that, in addition, the load carrier 34 with the container 36 is displaced by the distance Δx along the coordinate axis x with respect to the target position 40. The variables Δh, Δx, $v_s$, $v_h$, W described above and the mass M, as well as additionally the slope of the cable element 50', are responsible for the position that the load carrier 34 and the container 36 will assume with an uncorrected further downward course relative to the target position 40 if no correction of the target position approach path is made. These variables of condition are therefore also responsible for the necessary magnitude and direction of a corrective force K which, as described above, must be produced for the container, when its bottom reaches the level D of the ship 14, to actually hit the target position 40 and be able to enter the container-accommodating compartment 42 without a stop.

In order to be able to determine the values Δh and Δx, a disconnectable target-detection means 64 is mounted on the load carrier 34. The target-detection means 64 is capable of swinging about a swivel point 70.

A characteristic structure of the entrance 40 of the container compartment, i.e., the target location, is the corner angle 72 of the container compartment entrance 40. It can readily be imagined that the position of the spreader 34 upon entry of the container 36 into the compartment 42 is such that two diagonally opposite corners of the container 36 are in vertical alignment with two diagonally opposite corners of the container compartment 42. Accordingly, care must be taken to see that this position of alignment is attained, at the latest, at the time of entry of the container 36 into the compartment 42. In order to attain this position of alignment, the height Δh, inter alia,—as already indicated—must be measured, but in addition, also the horizontal deviation Δx and possibly also a horizontal deviation in the direction of the y axis will have to be determined.

Even if approximate adjustment of the spreader and the container 34 and 36, respectively, is already produced by specification of an address signal with regard to the container compartment 42 to be selected when the spreader 34 with the container 36 reaches the region of the compartment 42, it may be absolutely necessary for the target detection means 64 first of all to identify the corner angle 72 as a characteristic structure of the target location, i.e., of the container compartment entrance 40. The target detection means 64 is designed to do this, as seen in FIGS. 2, 3a and 3b.

Figure 2:
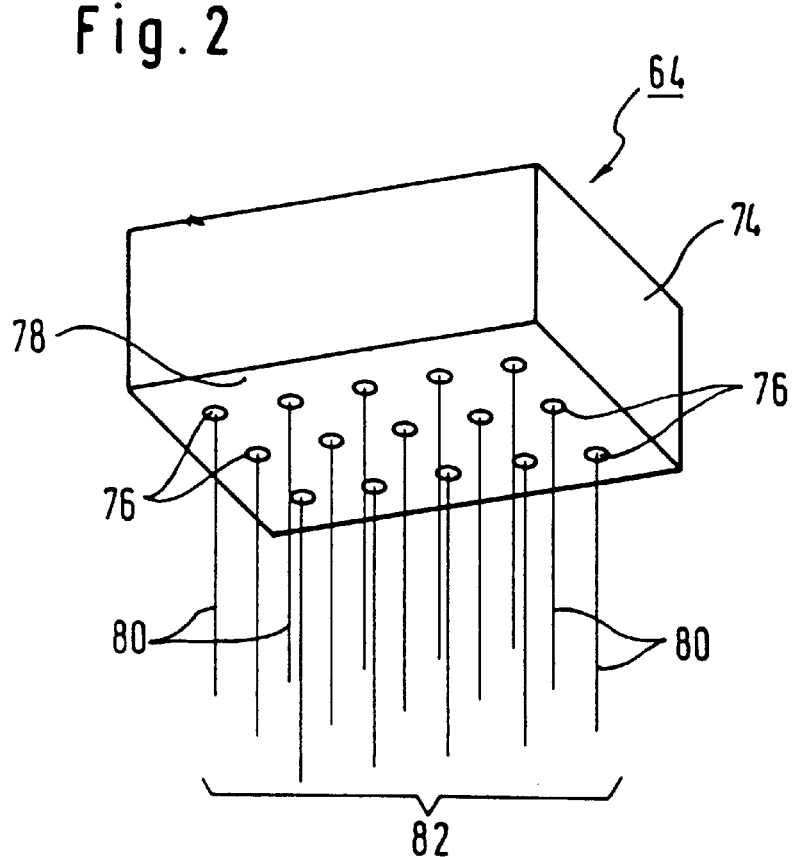
FIG. 2, as a detail of FIG. 1, a directional beam-emitting unit, represented schematically.
Figure 3B:
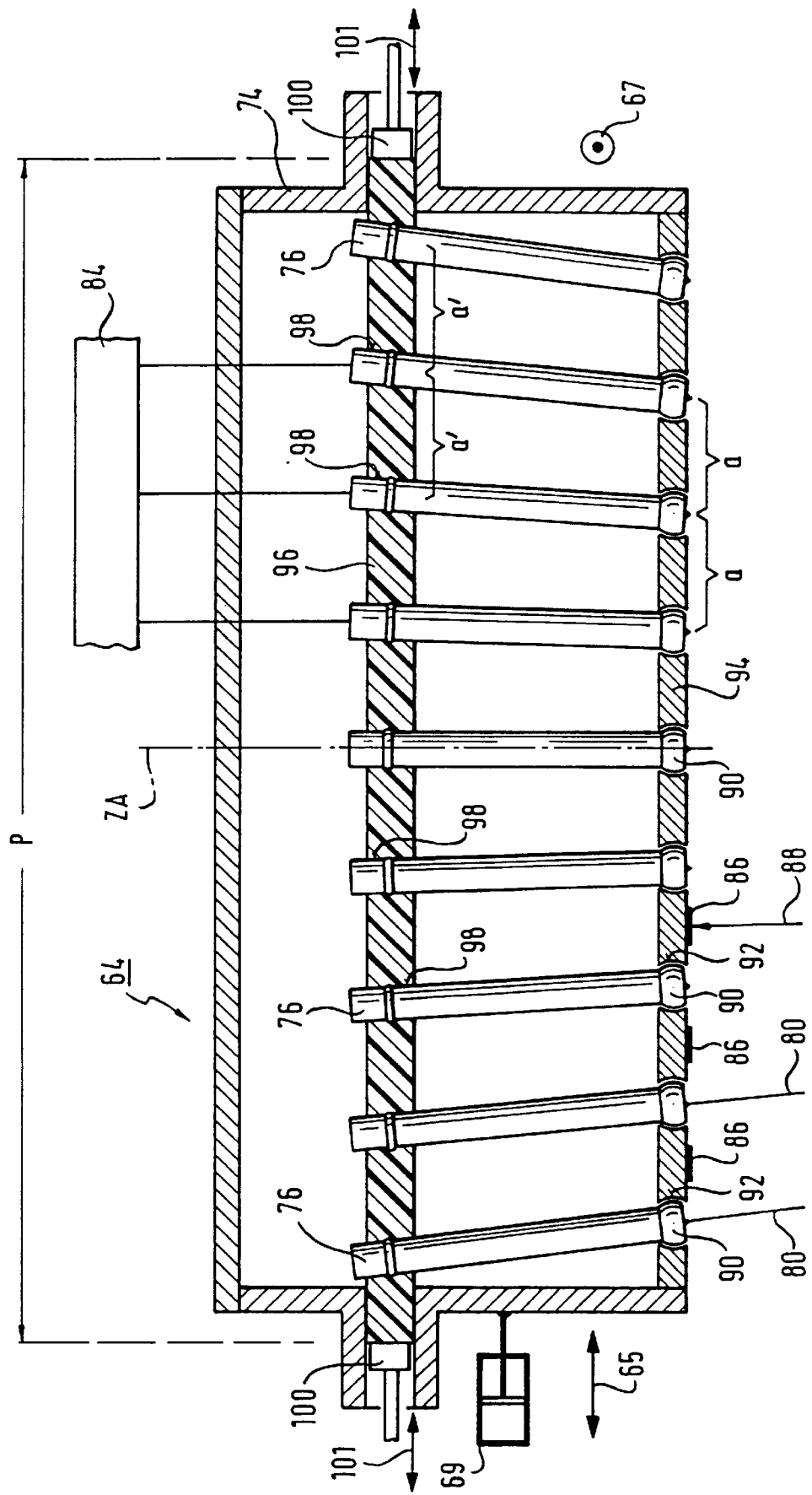

In FIG. 2, it can be seen that the target detection means 64 comprises a frame 74, which may alternatively be termed a directional beam-emitting unit. A plurality of laser-beam emitters 76 is arranged in an array over an approximately rectangular field 78, so that all laser-beam emitters 76 emit directional rays 80 in the form of a directional beam bundle 82 running vertically downward. The frame 74 is carried for pivotal movement about the swivel point 70 (see FIG. 1), specifically, about a swivel axis orthogonal to the plane of the drawing, as well as about a horizontal swivel axis parallel to the plane of the drawing.

Swiveling of the frame 74 about the two swivel axes causes the parallel beam bundle 82 to fall approximately on a corner angle region 72. The dimensions of the frame 74 and the number of laser-beam emitters 76 understandably are limited, firstly, with regard to spatial accommodation of the frame 74 in the region of the spreader 34, and secondly, with regard to costs, increasing with the number of laser-beam emitters 76. Nevertheless, in order for the directional beam bundle 82 to be able to detect a corner region 72 with its characteristic features, especially with a great height of the spreader 34 over the level D, the frame would have to assume a size hardly acceptable in practice, with a corresponding number of laser-beam emitters 76. For this reason, the emitters 76 are arranged to emit beams that diverge relative to each other, as represented in FIG. 3a. As a consequence of this diverging arrangement of the laser-beam emitters 76, with a small size of the frame 74 and a comparatively small number of emitters 76, especially with a great height of the spreader 34 over the ship's level D, a large detection region can be covered, which, for one thing, offers a great probability of rapidly identifying and including the corner angle 72 completely in the detection region. In this way, it is then possible to obtain an approximate image of the corner angle region 72 by means of the laser-beam emitter.

Here, it is necessary, first of all, to briefly describe the operation of the target detection device 64. The laser-beam emitters 76 are connected with a common firing means 84, which makes it possible to fire the emitters 76 successively in time, so that each one of the emitters 76 emits a pulsed directional beam 80 at brief intervals of time. Provided that the frame 74 is aligned with a corner angle region 72, the successively emitted)pulsed directional beams 80 are reflected in the corner angle region partly on the level D of the ship's surface, partly on the floor, not shown, of the container-accommodating compartment 42 or on the surface of a container located there. The individual directional beams, reflected with scattering, strike the reflection-receiving unit 86 as scattered reflection 88. The travel time of the directional beam 80 or of the scattered reflection 88 of the laser-beam emitter 76 to the reflection-receiving unit 86 is measured electronically for each individual one of the successively fired directional beams. This travel-time measurement makes it possible to decide, for each successively emitted directional beam 80, according to travel time, whether these were reflected on the surface D or in the depth of the container compartment 42. Now, if the location and the orientation of the emitters and hence of the directional beams 80 are known and, if in addition the height of the target detection unit 64 is known, for example, from the shorter travel times in each instance, the points of impingement or regions of impingement of the directional beams 80 in the plane D, specifically, referred to a spreader-fixed coordinate system, can be found by simple trigonometric calculations from knowledge of these magnitudes. Now, if it has been found that two adjacent directional beams 80 have unlike travel times and the coordinates of the points of impingement of these adjacent directional beams 80 on the plane D can be seen, it is found from the fact of unlike travel time that a difference in level must be present between these points of impingement of the directional beams 80 and thus the location of an edge of the corner angle 72 has been bracketed.

A multiplicity of such operations allows the course of the corner angle region 72 to be established with reference to the spreader-fixed coordinate system and hence the position of the spreader 34 and/or the container 36 relative to this corner angle region 72. Now, if the position of two diagonally opposite corners of the spreader 34 or of the container 36 with respect to associated corner angle regions 72 has been established in this way in terms of data, on the basis of these data a representation of the position of the spreader 34 or container 36 with respect to the corner angle regions 72 can be produced on a display screen, so that an operator, knowing the relative position of the spreader 34 and the container 36 on the one hand and the corner angle regions 72 on the other, can give position-correcting impulses to the power devices 60. Alternatively, the data obtained concerning the relative position of the spreader 34 and container 36 with respect to the corner angle regions 72 may be used to produce control signals directly for actuation of the power devices 60, so that the latter cause a correction of the target path of the spreader 34 and container 36 on the remaining downward path Δh, which leads to entry of the spreader 34 or container 36 into the container-accommodating compartment 42 on the additional downward path.

The distance apart of adjacent points of impingement of the directional beams 80 is responsible for the accuracy of representation of the corner angle regions 72. Divergence of the bundle 82 of directional beams 80, which as explained above is valuable for obtaining a large detection region, therefore, proves to be disadvantageous for the determination of a precise image of the corner angle region 72, since it leads to great distances apart of the points of impingement of adjacent directional beams 80. For this reason, it is provided that the orientation of the laser-beam emitters 76, which, according to FIG. 3a, result in a bundle of directional beams diverging downward, may be varied in direction to the condition of FIG. 3b, where the emitters 76 and the generally downwardly directed beams 80 converge. In this way, the distance apart of the points of impingement of the directional beams 80 on the plane D becomes smaller with simultaneous reduction of the detection regions, so that a precise image of the corner angle 72 is obtained. It may alternatively be said that "the resolving power is improved."

Representation in the condition of FIG. 3b is determined in exactly the same way as described above for the condition of FIG. 3a.

It is possible, for example, at a specific height of the spreader 34 and the container 36 first to use the laser-beam emitters in the opposite orientation of FIG. 3a, in order to establish an approximate image of the surroundings of the container compartment entrance and thereby identify the corner angle regions 72 characteristic for the target location. Once these are identified, the resolving power can be increased by transition to the condition of FIG. 3b, with the result that a sharp image of the corner angle regions 72 is obtained, one which is sharp enough to perform the necessary position corrections of the spreader 34 and/or container 36. If it is found that in the initial target observation with the arrangement of the laser-beam emitters 76 of FIG. 3a the corner angle region 72 of interest lies at the edge of the detection region defined by the points of impingement of the directional beams 80 on the plane D, a swiveling motion of the frame 74 at the swivel point 70 may be undertaken before carrying out the transition from the angle adjustment of the emitters 76 of FIG. 3a to the angle setting of FIG. 3b, so that the central axis ZA of the directional beam-emitting unit formed by the laser-beam emitters 76 falls into the corner angle region 72. In this way, even after transition to the condition of FIG. 3b has been effected, the corner angle region 72 also lies completely in the detection region defined by the points of impingement of the directional beams 80.

According to FIGS. 3a and 3b, the laser-beam emitters 76 are rod-shaped. At their lower ends, the rod-shaped emitters are seated by Cardan-joint heads 90 in spherical bearing apertures 92 of a mounting plate 94. The bearing apertures 92, adjacent to one another in the direction parallel to the plane of the drawing and in the direction orthogonal to the plane of the drawing, have like distances "a" apart. Near their upper ends the rod-shaped emitters penetrate an elastomer plate 96 in pass-through openings 98, which again have like distances "a'" apart in the direction parallel to the plane of the drawing and in the direction orthogonal to the plane of the drawing. The elastomer plate 96 is capable of being loaded, in the direction parallel to the plane of the drawing, by two facing edge engagement strips 100, so that by adjustment of said strips 100, under the effect of force, they can be converted from the condition of FIG. 3b into the condition of FIG. 3a. Corresponding edge engagement strips (not shown) are likewise provided on the edge surfaces of the elastomer plate 96 parallel to the plane of the drawing.

Of course, it is alternatively possible to subject the edge strips 100 to tensile forces, so that a starting condition of FIG. 3a can be converted into the condition of FIG. 3b by the action of tensile force. In this case the elastomer plate 96 may alternatively be designed as a relatively thin sheet, so that no risk of folding or buckling exists.

For calibration of the target-detection means, the elastomer plate 96 may be subjected to a plurality of unlike load conditions, to each of which a specific orientation of the laser-beam emitters 76 corresponds. Now, if the orientation of the emitters 76 is determined for each of these load conditions, corresponding orientation data for individual emitters 76 are available for each condition of the elastomer plate 96. These orientation data may be stored in a data memory in relation to the respective load values, so that by input of the respective load values the orientation data can easily be called up from the memory when they are needed in order to determine the space coordinates of the points of impingement of the directional beams 80 on the plane D.

Figure 4:
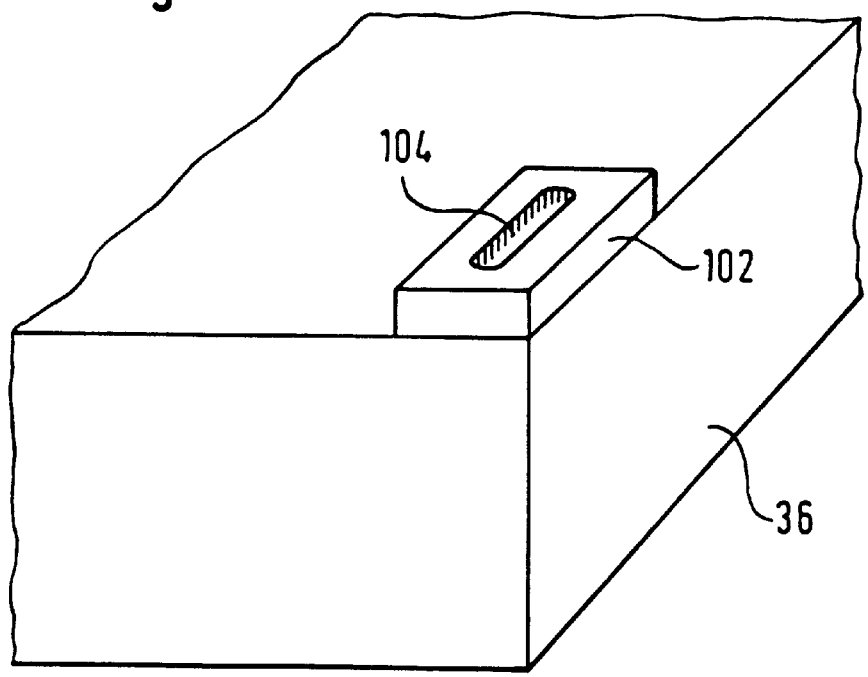
FIG. 4, a target location-characterizing corner structure of a container with a corner fitting for connecting a spreader.

It can readily be seen that, with the aid of the means described thus far, other target location-characterizing structures may be identified and determined in their position with respect to a spreader-fixed coordinate system. Reference is made, for example, to FIG. 4, where the corner of a container 36 is represented. A corner fitting 102 is seen at this corner. Said fitting 102 has an undercut opening for the connection of coupling elements of the spreader 34. The undercut opening is labeled 104. Its contour is recognizable by position finding of adjacent points of impingement of directional beams, which have unlike travel times corresponding to the difference in level inside and outside the hole region.

When, as represented, the directional beam-emitting unit formed by all the laser-beam emitters 76 is carried for swiveling uniaxially or biaxially at the swivel point 70, for determination of the space coordinates of the points of impingement of the directional beams on the plane D, it is also necessary to determine the swivel angles at the swivel point 70, for instance by goniometer units, and to take the measured values determined in goniometer units into consideration in calculating the space coordinates of the points of impingement of the directional beams 76 on the plane D.

According to the invention, it is possible, with increasing approximation of the spreader 34 or load 36 to the plane D, to pass over, continuously or stepwise, from the divergent orientation of the laser-beam emitters 76 of FIG. 3a to a parallel bundling or the convergent orientation of FIG. 3b, in order thereby to improve the "resolving power."

Figure 5:
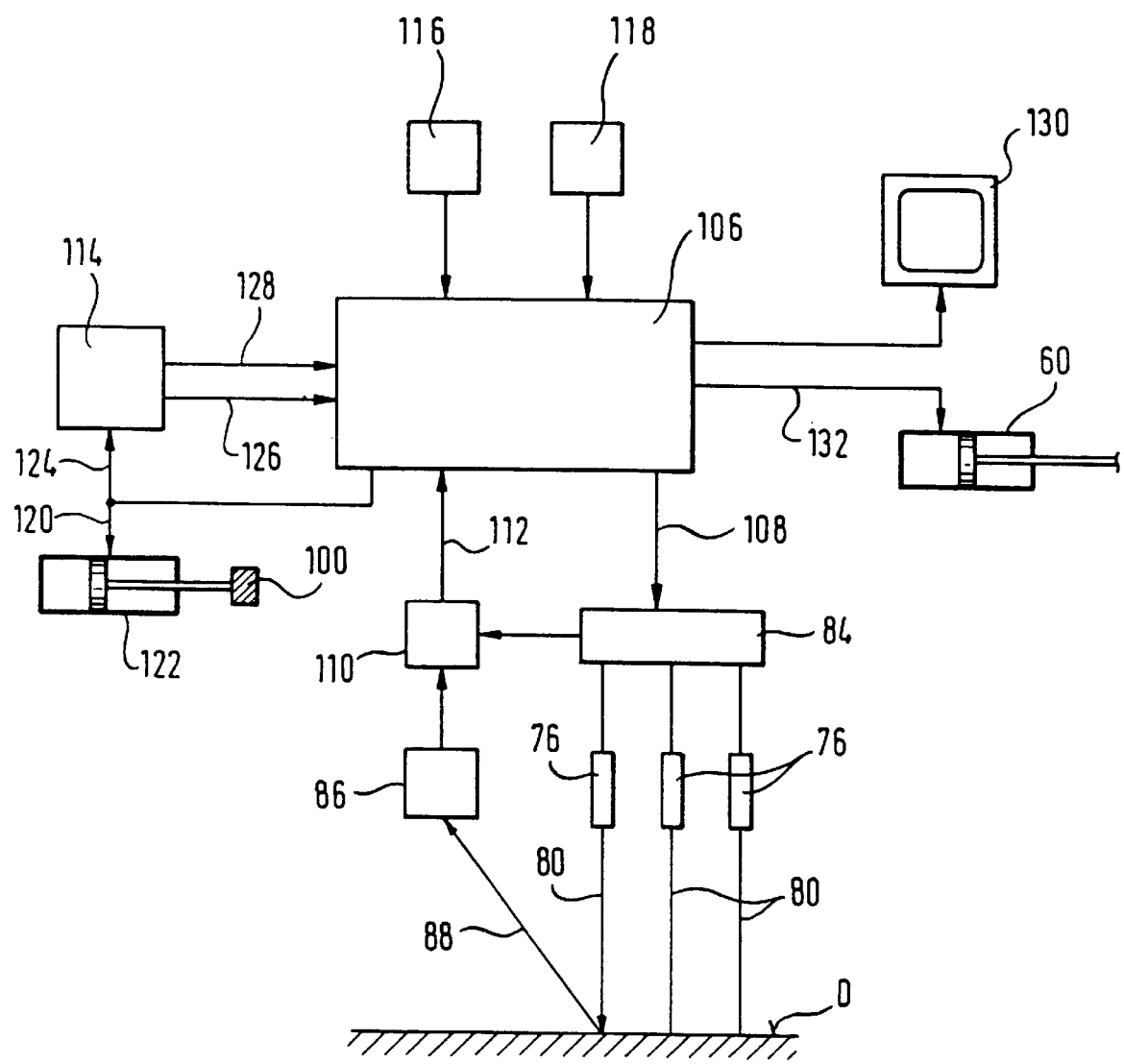
FIG. 5, a block diagram for the functional routine of a detection operation.

In FIG. 5, the laser-beam emitters 76 are again seen in relation to the deck surface D. The emitters 76 are successively fired by the ignition unit 84; firing takes place each time that a starting signal 108 is given by a computer 106 to the ignition unit 84. The pulsed directional beams 80 issuing from the emitters 76 successively reach the reflection-receiving unit 86. The travel times of individual directional beams 80 are successively measured in the travel time-measuring means 110, to which is imparted the starting time of a pulsed laser beam 80 by the ignition unit 84 and the receiving time of the backscattered laser radiation 88 by the reflection-receiving unit 86 in each instance. The results of travel-time measurements are communicated to the computer 106 via a line 112 in a sequence corresponding to the firing of the laser emitters 76. The computer 106 is provided with a data memory 114, in which the space coordinates within the frame 74 and the orientation data for each load condition of the elastomer plate 96 for each laser-beam emitter 76 are stored. In addition, the computer 106 is connected with goniometer units 116 and 118, which supply the computer 106 with the respective angle settings of the frame 74 about the swivel point 70 with regard to the spreader-fixed coordinate system. The computer 106 establishes the load conditions of the elastomer plate 96 and for this purpose gives load adjustment signals, via a line 120, to a power device 122 acting on the edge strips 100. A signal identifying the respective load condition reaches the memory 114 from the power device 122 via a line 124, so that those orientation data regarding the laser-beam emitters 76 which correspond to the load condition set on the elastomer plate 96 in each instance reach the computer 106 from the memory 114 via the line 126. In addition, the location data of the emitters 76, i.e., the data defining the position of the ball heads 90 in the mounting plate 94, reach the computer 106 from the memory 114 via a line 128. Screen control signals which generate a three-dimensional image of the respective detection region on a screen 130 can be obtained from the data supplied to the computer 196.

Alternatively or additionally, signals which determine the necessary corrective force of the power device 60 in the light of the parameters $v_s$, $v_h$, W, M, $\Delta x$ and $\Delta h$ may also be given by the computer 106, via a line 132, to the power device 60 (FIG. 1).

It has been pointed out that the pulsed directional beams 80 are successively emitted spaced apart in time. Let the total time between firing of a first one of the emitters 76 and firing of the last emitter be called the detection time. The detection time is made short enough so that, in the light of the movements to be expected of the spreader 34 and the ship 14, the relative position between spreader and ship during the detection time remains essentially unchanged.

It is also to be pointed out that, when speaking of a directional beam, the term "directional beam" in the sense of the invention may alternatively signify a plurality of successive directional beams of like geometric relation to the spreader-fixed coordinate system. The use of such a sequence of directional beams, which strike the same point of impingement on the deck surface D, makes a plurality of travel-time measurements available in order to permit as accurate as possible a travel-time value to be obtained by taking the average.

Figures 6A, 6B, 6C, 7A, 7B, 7C:
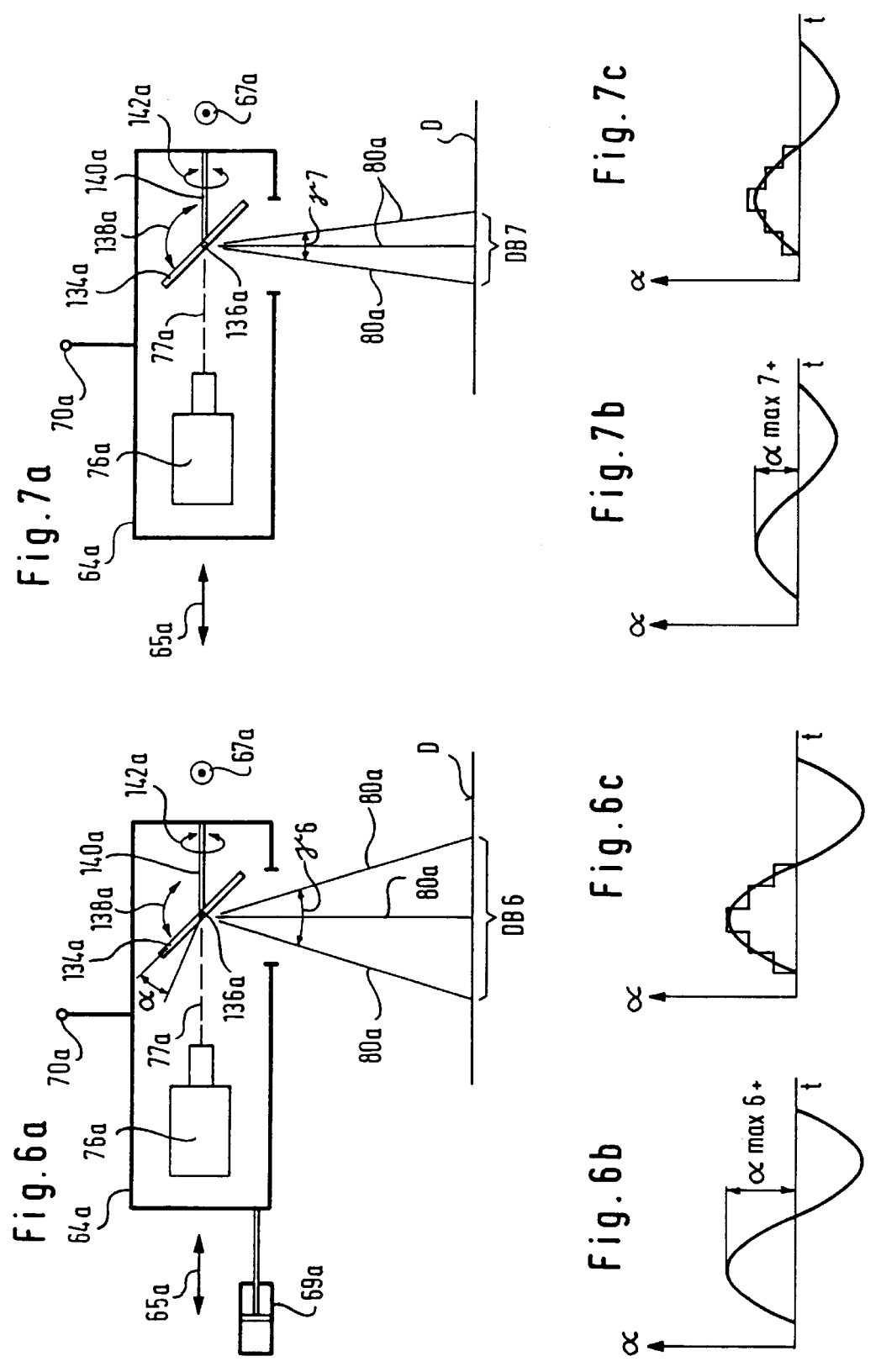

An additional embodiment of a target-detection means is represented in FIGS. 6a, 6b, 6c and 7a, 7b, 7c. FIGS. 6a and 7a show the target-detection means 64a in a variety of operating conditions.

The target-detection unit 64a comprises a single laser-beam emitter 76a, which directs a basic beam 77a toward a swivel mirror 134a. The mirror 134a is capable of swiveling about a swivel axis 136a in the direction of the swivel arrow 138a. The middle position of the swivel mirror 134a is shown in FIG. 6a, and the present angle coordinate of the swivel path is labeled α. In the laser-beam source 76a, pulsed basic beams 77a are successively fired, which, owing to the varying adjustment of the swivel mirror 134a during the firing sequence, results in a bundle of directional beams 80a diverging downward which successively strike the deck surface D and in doing so describe the detection region DB6.

A three-dimensional bundle of directional beams 80a may, of course, alternatively, be generated by in addition allowing the mirror to rotate oscillating by a swivel shaft 140a in the direction of the swivel arrow 142a. In the following, only the plane case is considered.

Divergence of the bundle of directional beams 80a is designated by the angle between radii γ6. This is the angle between the two directional beams 80a which in each instance results upon maximum deviation α of the swivel mirror 134a in one or the other direction.

The additional directional beams lying between the two outermost beams 80a are not shown; only the central beam 80a is shown.

The orientation of each of the directional beams is determined by the instantaneous angle α. The course of the angle α as a function of time is represented in FIG. 6b. The outermost beams 80a of the directional beam bundle of FIG. 6a are produced when the angle deviation α of the swivel mirror 134a reaches the value αmax6+ or αmax6−.

While a relatively wide-angled bundle of directional beams 80a with the central angle γ6 is produced in FIG. 6a, according to FIG. 7 a much narrower bundle of directional beams 80a is obtained with the central angle γ7. FIG. 6a corresponds to a greater detection region DB6, and FIG. 7a corresponds to a smaller detection region DB7. The operating condition of FIG. 6a therefore corresponds approximately to searching for a target structure, while the condition of FIG. 7a serves for more detailed examination of the fine structure of a target structure.

The difference between the operating conditions of FIG. 6a and FIG. 7a is based upon the fact that the course of swivel motion of the swivel mirror 134a, corresponding approximately to a sine curve, has a greater amplitude αmax6 according to FIG. 6b and a smaller amplitude αmax7 according to FIG. 7b. Accordingly, by simple variation of amplitude of the periodic course of swivel α, it is possible to obtain unlike widths of aperture of the bundle of directional beams 80a and hence unlike detection regions.

In FIGS. 6c and 7c it is indicated that in the case of stepwise swivel motion of the swivel mirror 134a, the step size of the respective swivel angle variation α must be reduced upon transition from the great amplitude αmax6 to the small amplitude αmax7.

In the embodiment of FIG. 8, similar components of a directional beam-emitting unit 64b are provided with the same reference numerals as in the embodiment of FIGS. 3a and 3b, but supplemented by the addition of b.

There is a frame 74b, in which rod-shaped laser-beam emitters 76b are seated by means of Cardan-joint heads 90b in spherical bearing apertures 92b of a mounting plate 94b. At their upper ends, the rod-shaped emitters 76b are designed with semi-spherical control heads 150b. These control heads 150b engage in control bores 152b of a control piston 154b, serving as control surface support, which is displaceable in the frame 74b in the direction of the double arrow 156b. The control bores 152b are arranged on concentric circles about the central axis ZA and are inclined so that upon displacement of the control piston 154b in the direction of the double arrow 156b a change in the angle between the emitters 76b occurs, similar to the change in angle that occurs in the example of FIGS. 3a and 3b due to elastic deformation of the elastomer plate 96.

A double arrow 158b indicates that the target-detection means 64b may alternatively be rotated as a whole., Referred to FIG. 1, this swinging ability corresponds to a swinging about the swivel point 70. In this way, for one thing, a swiveling motion of the frame 74b can be undertaken, so that the central axis ZA of the directional beam-emitting unit 64b formed by the laser emitters 76b falls into the corner angle region 72. In addition, the following possibility-exists: In a specific angle arrangement of the laser-beam emitters 76b to one another, corresponding to a specific axial position of the control piston 154b with respect to the frame 74b, the target-detection means 64b may be subjected to a scanning motion of small angular amplitude in the direction of the double arrow 158b, so that, without varying the relative angular position of the laser-beam emitters 76b, a bundle of emitters 76b and hence the beams 80b issuing from them perform a synchronized scanning motion with respect to an edge 72b to be observed according to FIG. 9 of a corner angle 72 (see FIG. 1).

FIG. 9 shows, drawn in solid lines, two directional beams 80b immediately adjacent to one another in a first time and hence angular phase of the scanning motion and, represented in broken lines, the directional beams 80b' in a second subsequent time and hence angular phase of the scanning motion in the direction of the double arrow 158b.

The angle between the directional beams 80b, on the one hand, and the beams 80b', on the other, will be made smaller than the angle between successive beams 80b. In the course of a scanning motion, travel-time measurements may alternatively be taken in more than two time and location phases, and each of these travel-time measurements in turn may be assigned the space coordinates that apply in various phases of the scanning motion for adjacent directional beams. Then, if the geometric location of the beams for each of the directional beams 80b and 80b' is known, it is determined for a group of successive directional beam pairs in each instance whether the edge 72b is already bracketed, is still bracketed or is no longer bracketed. In this way, the position of the edge 72b can again be determined with increased accuracy by travel-time measurements in conjunction with associated geometric position data of the directional beams, without the number of laser-beam emitters 76b having to be increased. This scanning technique is also applicable in the embodiments previously described; for example, in FIGS. 3a and 3b the target-detection means 64 may be subjected to scanning motions in the direction of the double arrows 65 and 67, by allowing the additional drive means 69 to act approximately in the direction of the double arrow 65 and allowing a corresponding additional drive means, not represented, to act in the direction of the double arrow 67.

These additional drive means can then produce a scanning swinging motion about the swivel point 70 of FIG. 1; alternatively, it is also possible, for producing the scanning swinging motion, to subject the edge contact strips 100, while maintaining their distance P apart, jointly to a to and fro motion in the direction of the double arrows 101, the deformation condition of the plate 96 remaining essentially unchanged during this scanning motion, so that the angles between the emitters 76 remain unchanged.

In the case of the embodiment of FIGS. 6a–7c, a one-dimensional or two-dimensional scanning motion may be carried out for each of the angle settings of the directional beams 80a, for example, according to FIG. 7a, by moving the target-detection means 64a about the swivel point 70a in the direction of the double arrows 65a and 67a by means of an additional drive means 69a. Here, it is alternatively also possible to produce the scanning motion in that a modulating scanning motion is imparted to at least one of the rotary motions of the swivel mirror 134a in the respective position responsible for the angles γ6 and γ7. As a rule, use will be made of this scanning motion only when the angle γ7 of FIG. 7a is already small anyway and cannot be made smaller, in order thereby to obtain a higher resolving power by this scanning motion. In this scanning motion, the detection region DB7 then moves about the middle position shown in FIG. 7a.

The calibration operation already indicated earlier may be made in the embodiment of FIG. 3a approximately as follows: For each angle setting between the rod-shaped emitters 76 and hence between the directional beams 80 issuing from them, which is pre-determined by a specific distance apart of the edge strips 100, a scanning motion in the direction, for example, of the double arrow 65 is carried out by means of the additional drive means 69.

In a plurality of time phases within this scanning motion, the points of impingement 81 of all directional beams 80 are measured on a screen 83. With that, data concerning the orientation of the laser-beam emitters 76 relative to one another, or referred to a coordinate system which is defined by the central axis ZA, are obtained as a function of a parameter p, which in FIG. 3a corresponds to the respective position of the additional drive means 69, for the respective distance P apart of the edge contact strips 100. These data can now be stored in the data memory 114 as a function of the parameter p for a variety of parameters P, so that orientation data of the respective emitters 76 and hence the respective directional beams 80 can be called up for each parameter value pair p,P in the data storage 114 and, with the aid of the travel time data, the points of impingement that are needed for the three-dimensional representation of a corner region 72, for instance, can be determined. It can readily be seen that increased resolving power is obtained by scanning, even when the points of impingement of adjacent directional beams that correspond to a specific value of the parameter P are still relatively great.

Displacement of the detection means, for example, by means of the additional drive means 69 of FIGS. 3a and 3b or by means of the additional drive means 69a of FIGS. 3a–7c or by swivel motion of the detection means 64b in the direction of the double arrow 158b of FIG. 8, has previously been explained in the description above as a measure which leads to improvement of resolving power, in that two adjacent directional beams 80b according to FIG. 9, with unchanged position relative to one another with respect to the edge 72, are jointly slightly displaced to a degree that is smaller than the distance between the two directional beams 80b. However, a motion by means of the same additional drive means 69 of FIGS. 3a and 3b or the additional drive means 69a of FIGS. 6a–7c may alternatively be used to bring a specific target structure, for example again the corner structure 72 of FIG. 1, into the respective center of the detection region as a "follow-up."

Such follow-up may alternatively be effected in that, for example, the laser-beam emitters 76 in FIGS. 3a and 3b and hence their directional beams 80 are jointly displaced essentially with maintenance of the relative position of adjacent emitters 76, and their directional beams 80 are displaced relative to one another with respect to the frame 74 of FIGS. 3a and 3b, whereby displacement of the central axis ZA, in the sense of follow-up of "viewing direction," is obtained. Accordingly, a fine structure, for instance the corner structure 72 of FIG. 1, before reduction of the detection region, may be displaced into the center of the detection region in that in the embodiment of FIGS. 3a and 3b the two edge strips 100 are jointly displaced with maintenance of their distance P apart in the direction of the double arrows 101.

What is claimed is:

1. A method of target field observation in handling a load approaching a target position in said target field, comprising the following steps:
  a) a group of pulsed directional beams is emitted from a directional beam-emitting unit that is stationary with respect to the load with subsequent individual pulsed directional beams of said group being emitted in sequence at time intervals and with a spaced geometric relationship toward an observation area of said target field, so as to strike mutually spaced partial regions of the target field;
  b) scattered reflection corresponding to individual pulsed directional beams is received in a reflection-receiving unit having a predetermined geometric relationship with respect to the directional beam-emitting unit;
  c) the travel time from emission of a pulsed directional beam to receipt of the corresponding scattered reflection is determined for a plurality of individual directional beams of the group emitted to spaced regions of the target field;
  d) on the basis of the travel times so determined and of the spaced geometric relationship of the respective directional beams of said group data representing the structure of at least part of the target field are obtained, and
  e) the spaced geometric relationship of subsequent individual pulsed directional beams of the group is varied so as to increase or decrease the size of the observation area of the target field upon which said group of pulsed directional beams impinge.

2. The method according to claim 1, wherein the angles between individual directional beams to be emitted to mutually spaced partial regions of the target field are varied.

3. The method according to claim 2, wherein the individual directional beams emitted to spaced partial regions are aligned by direction-determining components individually assigned to them, and the directional effects of at least some of these direction-determining components are varied.

4. The method according to claim 2, wherein for the orientation of directional beams toward spaced partial regions of the target field a common direction-determining component having variable directional effects is used for these directional beams, and the course of variation of the directional effect is varied for varying the angle between these directional beams.

5. The method according to claim 1, wherein after detection of a target-characterizing target-structure zone within a greater observation area the observation area is reduced with reduction of the distances apart of the partial regions, if necessary after displacement of a center of the observation area toward the target-characterizing target-structure region.

6. The method according to claim 5, wherein the observation area is reduced as a function of approach of the load to the target field with reduction of the distances apart of the partial regions within the observation area.

7. The method according to claim 3, wherein a directional beam-emitting unit having a plurality of directional beam transmitters that are movable relative to one another is used and the relative orientation of the directional beam transmitters relative to one another is varied.

8. The method according to claim 4, wherein a reflecting element is used as a common direction-determining component which is subjected to a periodic motion for determination of the direction of directional beams to be emitted to unlike partial regions, and the amplitude of this periodic motion is varied for varying the distances apart of the partial regions at a constant frequency of the periodic motion.

9. The method according to claim 8, wherein in stepwise course of the periodic motion, the step length is varied in accordance with the variation in amplitude.

10. The method according to claim 1, wherein laser beams are used as pulsed directional beams.

11. The method according to claim 1, wherein at least one corner fitting of a container or a corner region of a container-accommodating compartment is detected as a target-characterizing target-structure zone.

12. The method according to claim 1, wherein during a condition of essentially unchanged geometric relation of the directional beams relative to one another, a common transverse displacement essentially transverse to the direction of travel of the directional beams is superimposed on a group of directional beams, and wherein, in defined time phases of the transverse displacement, on the basis of travel times measured in the respective time phase and known geometric relation of the directional beams displaced by the transverse displacement in the respective time phase, at least part of the target field is observed, the data representing the structure of at least part of the target field being obtained on the basis of measurements made in a series of time phases.

13. The method according to claim 1, wherein the spaced geometric relationship of directional beams to one another or to a common coordinate system is determined by at least one relationship determining parameter, a calibration process is applied in which data representative for the spaced geometric relationship of directional beams is determined for a plurality of values of this at least one parameter such that, in determining the data representing the structure of at least part of the target field, data representative of the spaced geometric relationship of the directional beams associated to a respective parameter value are obtained.

14. The method according to claim 13, wherein the data representative of the geometric relationship of individual directional beams associated to a respective value of the at least one parameter are obtained by measurement of the paths of respective directional beams.

15. The method according to claim 1, said method being used for controlling a correction of the path of the load to the target while said load is approaching the target, such that the load finds the target.

16. The method according to claim 1, wherein the load is a load carrier adapted to be connected with a load unit.

17. The method according to claim 15, wherein the load is a spreader adapted to be connected with a container.

18. A target field observation device for detecting the target location for a moving load within a target field comprising a directional beam-emitting unit associated with the moving load for common motion therewith, said beam-emitting unit being adapted to emit a group of individual pulsed directional beams in sequence with time intervals and with a spaced geometric relationship towards said target field, a reflection-receiving unit with known geometric relation to the directional beam-emitting unit, said reflection-receiving unit being adapted to receive scattered reflection corresponding to individual pulsed directional beams, a travel time-measuring apparatus for determining the travel time of pulsed directional beams from the moment of emission to the moment of receipt, a calculator unit for obtaining data representing the structure of at least part of the target field region on the basis of the measured travel times and the knowledge about the spaced geometric relationship of the respective directional beams to one another, and a beam path influencing device associated with the beam-emitting unit for varying the spaced geometric relationship of the directional beams of said group with respect to each other.

19. The target field observation device according to claim 18, wherein the beam path influencing device is adapted to vary the angle between individual directional beams of said group.

20. The target field observation device according to claim 19, wherein the beam path influencing device includes variable direction-determining components individually assigned to individual directional beams.

21. The target field observation device according to claim 9, wherein the beam path influencing device includes a common direction-determining component having a variable directional effect, the directional effect of the direction-determining component being variable in terms of variation of the relative angle between individual directional beams of the group.

22. The target field observation device according to claim 18, wherein the beam-emitting unit is variable in its geometric relationship with respect to a coordinate system moving with the load.

23. The target field observation device according to claim 22, wherein the directional beam-emitting unit has a central axis defined by the directional beams to be emitted to various partial regions of the target field whose angular position is variable with respect to the coordinate system moving with the load.

24. The target-field observation device according to claim 23, wherein the calculator unit obtains, on the basis of measured travel times, the known geometric relationship of the directional beams to one another and the known angular adjustment of the central axis with respect to the load carrier-fixed coordinate system, the data corresponding to a three-dimensional representation of the surface structure of at least part of the target field.

25. The target-field observation device according to claim 20, wherein the direction-determining components are carried for swiveling movement on a support and are connected with swiveling angle-adjusting system which permits the individual direction-determining components to swivel in mutual dependence.

26. The target-field observation device according to claim 25, wherein the swiveling angle-adjusting system includes an elastic connecting system, coupling together the direction-determining components outside the swivel bearing points, which is elastically deformable in at least one direction by the application of external forces.

27. The target-field observation device according to claim 26, wherein the elastic connecting system includes an elastomer member.

28. The target-field observation device according to claim 27, wherein the elastomer member is an elastomer plate which is deformable in at least one direction.

29. The target-field observation device according to claim 20, wherein the direction-determining components are composed of individual directional transmitters, each having an emission source.

30. The target-field observation device according to claim 29, wherein the directional transmitters are laser-beam transmitters.

31. The target-field observation device according to claim 25, wherein each of the direction-determining components is rod-shaped and is seated for swiveling motion at one of two points spaced apart in the longitudinal direction of the component, and is connected with the swiveling angle-adjusting system at the second of the axially spaced-apart points.

32. The target-field observation device according to claim 21, wherein the common direction-determining component having variable directional effect is composed of a directional beam-reversing element located in the path of a beam emanating from a common emission source, which element is connected with a periodic swivel drive, the periodic course of motion imparted to the common directional beam-reversing element being variable.

33. The target-field observation device according to claim 32, wherein the swiveling amplitude of the directional beam-reversing element at constant frequency is variable.

34. The target-field observation device according to claim 33, wherein the course of motion of the periodic swiveling motion is stepwise and is variable according to the magnitude of swiveling amplitude.

35. The target-field observation device according to claim 32, wherein the emission source is a laser-beam transmitter.

36. The target-field observation device according to claim 18, wherein the directional beam-emitting unit is connected for common movement with a load which is suspended for height displacement on a horizontally movable hoisting cable carrier by a hoisting cable system.

37. The target-field observation device according to claim 36, wherein the directional beam-emitting unit is mounted on a movable supporting element which is displaceable relative to a carrier of the load between an active position and a retracted position, the active position being arranged so that directional-beam impacting on the target field is possible even when the load carrier is joined with a load and the retracted position being arranged so that the load carrier is able to enter cramped spaces in ships.

38. The target-field observation device according to claim 18, wherein to the directional beam-emitting unit there is assigned a transverse displacement movement which is adapted, in at least one condition of the geometric relationship of a group of directional beams to one another, to impart a common transverse displacement to the directional beams of the group, and in that the calculator unit calculates the data representing the structure of at least part of the target field for a variety of transverse displacement conditions of a series of transverse displacement conditions which are brought about by the common transverse displacement.

39. The target field observation device according to claim 18, in combination with a load path correcting device for correcting the load path of the load when approaching said target position.

40. A directional beam-emitting unit, comprising a plurality of beam direction-determining components arranged in a predetermined array, the individual direction-determining components being arranged for movement relative to one another on a common support and for displacement relative to one another by a drive system which is common to them all.

41. The directional beam-emitting unit according to claim 40, wherein the individual direction-determining components are carried for swiveling motion at swivel-bearing points on the common support and are acted upon by the common drive system at a position spaced apart from the common support.

42. The directional beam-emitting unit according to claim 41, wherein the common drive system is composed of an elastic connecting system connecting the direction-determining components with one another, which system is deformable by the action of external force, so that as a consequence of the deformation coordinated swiveling motions are imparted to the individual direction-determining components.

43. The directional beam-emitting unit according to claim 42, wherein the elastic connecting system comprises an elastomer member, which is deformable in at least one direction.

44. The directional beam-emitting unit according to claim 43, wherein the direction-determining components are rod-shaped which penetrate the elastomer member and are thereby articulated with respect to the elastomer member.

45. The directional beam-emitting unit according to claim 44, wherein the swivel bearing points of adjacent direction-determining components are substantially equidistant from one another within the array, and in that the connecting points of adjacent direction-determining components with the elastic connecting system are likewise substantially equidistant from one another and the distance apart of these connecting points from one another is essentially constantly increased or reduced when force acts upon the elastic connecting system.

46. The directional beam-emitting unit according to claim 41, wherein the common drive system has control surfaces for the individual direction-determining components which are in engagement with the direction-determining components outside the respective swivel bearing.

47. The directional beam-emitting unit according to claim 46, wherein the control surfaces are mounted on a control surface support common to at least one group of direction-determining components.

48. The directional beam-emitting unit according to claim 47, wherein the control-surface support is movable essentially orthogonally to a swivel bearing surface containing the swivel bearings and has a control bore for each of the individual direction-determining components.

49. The directional beam-emitting unit according to claim 40, wherein at least one group of direction-determining components is displaceable by an additional displacement unit.

50. The directional beam-emitting unit according to claim 49, wherein the additional displacement unit acts upon the common support of the direction-determining components.

51. The directional beam-emitting unit according to claim 49, wherein the additional displacement unit acts upon the common drive system.

* * * * *

UNITED STATES PATENT AND TRADEMARK OFFICE
CERTIFICATE OF CORRECTION

PATENT NO. : 6,124,932
DATED : September 26, 2000
INVENTOR(S) : Tax et al.

It is certified that error appears in the above-identified patent and that said Letters Patent is hereby corrected as shown below:

Column 24,
Line 25, "44," should read -- 42, --

Signed and Sealed this

Twenty-third Day of October, 2001

Attest:

*Nicholas P. Godici*

NICHOLAS P. GODICI
*Attesting Officer*   *Acting Director of the United States Patent and Trademark Office*